United States Patent
Sultan et al.

(10) Patent No.: US 7,581,142 B2
(45) Date of Patent: Aug. 25, 2009

(54) METHOD AND SYSTEM USABLE IN SENSOR NETWORKS FOR HANDLING MEMORY FAULTS

(75) Inventors: Florin Sultan, Princeton, NJ (US); Kiran Nagaraja, Plainsboro, NJ (US); Srimat T. Chakradhar, Manalapan, NJ (US); Ram Kumar Rengaswamy, Los Angeles, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 419 days.

(21) Appl. No.: 11/616,086

(22) Filed: Dec. 26, 2006

(65) Prior Publication Data

US 2007/0156951 A1    Jul. 5, 2007

Related U.S. Application Data

(60) Provisional application No. 60/743,092, filed on Jan. 3, 2006.

(51) Int. Cl.
*G06F 11/00* (2006.01)
(52) U.S. Cl. ........................................... 714/38
(58) Field of Classification Search ............... 714/2–5, 714/7, 8, 15, 16, 20, 21, 37–39, 42, 43, 47, 714/52

See application file for complete search history.

(56) References Cited

U.S. PATENT DOCUMENTS

| | | | |
|---|---|---|---|
| 3,905,023 A * | 9/1975 | Perpiglia | 714/6 |
| 6,330,633 B1 | 12/2001 | Kusakabe | |
| 6,438,408 B1 | 8/2002 | Mulligan | |
| 6,662,286 B2 | 12/2003 | Kusakabe | |
| 6,950,907 B2 | 9/2005 | Garnett | |
| 7,036,125 B2 | 4/2006 | Basso | |
| 7,107,487 B2 | 9/2006 | Ahmad | |

(Continued)

OTHER PUBLICATIONS

Candea, G. et al., "Microreboot—A Technique for Cheap Recovery", Proc. of the 6th Symposium on Operating Systems Design and Implementation (OSDI), Dec. 2004.

(Continued)

*Primary Examiner*—Nadeem Iqbal
(74) *Attorney, Agent, or Firm*—Joseph J. Kolodka (57) ABSTRACT

A method and system usable in sensor networks for handling memory faults is disclosed. In order to protect the operating system of a sensor node, coarse-grained memory protection is provided by creating and enforcing an application fault domain in the data memory address space of the sensor node. The data memory accessed by the application modules is restricted to the region (which defines the application fault domain) within the data memory address space. The application modules are prevented from accessing memory outside the application fault domain through software-based run-time checks. The state belonging to the operations system is maintained outside of the application fault domain, and is thus protected from memory corruption from any application module. In order to ensure that an application module does not operate on a corrupted state, fine-grained error detection and recovery is provided within the application fault domain. Any corruption of memory within the application fault domain is detected by a run-time memory integrity verifier implemented in the operating system kernel. Recovery involves purging the corrupted state and restarting only the affected application module to operate on an uncorrupted state.

21 Claims, 4 Drawing Sheets

U.S. PATENT DOCUMENTS

| | | | |
|---|---|---|---|
| 7,117,422 B2 * | 10/2006 | Duncan et al. | 714/766 |
| 7,383,490 B2 * | 6/2008 | Almasi et al. | 714/800 |
| 7,434,105 B1 * | 10/2008 | Rodriguez-Rivera et al. | 714/38 |
| 7,490,268 B2 * | 2/2009 | Keromytis et al. | 714/38 |
| 2003/0012168 A1 | 1/2003 | Elson | |
| 2003/0023933 A1 * | 1/2003 | Duncan | 714/807 |
| 2003/0140299 A1 * | 7/2003 | Duncan et al. | 714/763 |
| 2003/0221155 A1 * | 11/2003 | Weibel et al. | 714/752 |
| 2004/0054989 A1 | 3/2004 | Harres | |
| 2005/0182862 A1 | 8/2005 | Ritz | |
| 2006/0092042 A1 | 5/2006 | Davis | |
| 2006/0095518 A1 | 5/2006 | Davis | |
| 2006/0195745 A1 * | 8/2006 | Keromytis et al. | 714/741 |
| 2006/0248370 A1 * | 11/2006 | Almasi et al. | 714/4 |
| 2007/0168718 A1 * | 7/2007 | Reblewski et al. | 714/15 |

OTHER PUBLICATIONS

Kowshik, S. et al., "Ensuring Code Safety Without Runtime Checks for Real-Time Control Systems", CASES 2002, Oct. 8-11, 2002, Grenoble, France, 2002 ACM.

Candea, G. et al., "Microreboot—A Technique for Cheap Recovery", Appears in Proc. of the 6th Symposium on Operating systems Design and Implementation (OSDI), Dec. 2004.

Witchel, E. et al., "Mondrian Memory Protection", ASPLOS-X'02, San Jose, CA, 2002 ACM.

Swift, M.M. et al., "Improving the Reliability of Commodity Operating Systems", ACM Transactions on Computer Systems, vol. 23, No. 1, pp. 77-110, Feb. 2005.

Qin, F. et al., SafeMem: Exploiting ECC-Memory for Detecting Memory Leaks and Memory Corruption During Production Runs', Proceedings of the 11th International Symposium on High-Performance Computer Architecture, 2005 IEEE.

Simpson, M. et al., "Segment Protection for Embedded Systems Using Run-Time Checks", CASES'05, Sep. 24-27, 2005, San Francisco, CA, 2005 ACM.

Wahbe, R. et al., "Efficient Software-Based Fault Isolation", SIGOPS'93, 1993 ACM.

Han, C-C. et al., "A Dynamic Operating System for Sensor Nodes", International Conference on Mobile Systems, Applications and Services, Operating Systems for Sensor Networks, Seattle, Washington, pp. 163-176, 2005.

* cited by examiner

METHOD AND SYSTEM USABLE IN SENSOR NETWORKS FOR HANDLING MEMORY FAULTS

This application claims the benefit of U.S. Provisional Application No. 60/743,092 filed Jan. 3, 2006, the disclosure of which is herein incorporated by reference.

BACKGROUND OF THE INVENTION

The present invention relates to handling memory faults, and more particularly to a system and method usable in sensor networks for handling memory faults.

Sensor networks typically comprise multiple wireless sensor devices. Each wireless sensor device acts as a node in the sensor network. Data sensed at each sensor node is transmitted to a base station via the sensor network. Recent developments in sensor network technology have enabled distributed applications to run on sensor networks. Sensor networks are increasingly being used in industrial, commercial, and medical applications. The growing popularity and importance of sensor networks in these fields have led to increased demand for sensor networks. For example, CodeBlue, a prototypical medical sensor network platform used in emergency care and disaster response scenarios, requires uninterrupted reliable, long-lived and secure operation. Other examples include sensor networks implemented for use in industrial processes and security systems. Any unexpected failure in a sensor network system can be detrimental, ranging from financial losses to life-threatening situations. Software faults are a common reason for failure of sensor nodes. In particular, corruption of the application and kernel state due to a lack of protection from other applications can lead to a crash or freeze of the node or corruption of sensed data.

Sensor nodes typically have a simple architecture. Accordingly, the architecture of sensor nodes usually does not include features such as a memory management unit, privileged mode execution, etc., which are used in desktop/server class systems to isolate or protect the data and code of one program from other programs. Further, the micro-controllers used in sensor nodes typically have separate memories for program and data storage, and the entire data memory of the sensor node is accessible to all program modules running on the sensor node via a single address space.

Although the sensor node architecture is relatively simply, the software running on a sensor node can be complex. The software complexity arises out of a need to support diverse types of sensors, multiple distributed middleware services, dynamic code updates, and concurrent applications in a resource-constrained environment. In order to implement the software components, programmers have to deal with several resource constraints, concurrency, and race condition issues. Furthermore, limited debugging support on sensor node hardware makes programming errors common. These errors can lead to memory faults in which applications corrupt the memory used by other applications. In addition to corruption by other applications, memory faults can also be caused by hardware failures, transient errors, etc. The impact of memory faults can be quite severe, ranging from node freeze (fail-stop), to silent corruption, in which bad data, generated by the afflicted sensor node, further propagates through the sensor network and disrupts the operations of other sensor nodes in the network.

In high end desktop/server class systems, approaches for protecting against memory corruption typically fall into one of two categories: static program analysis tools or runtime memory access checkers. Static program analysis tools rely either on language restrictions of type-safe languages like Java and ControlC, or on programmer annotations/language extensions for flagging illegal memory accesses. These tools impose considerable restrictions on the language, additional burden on programmers to guarantee safety, or add significant resource inefficiencies that cannot be efficiently implemented in sensor network systems. Run-time checks to stop illegal memory access in desktop/server class systems have been pursued at the expense of added overhead. For example, Software-based fault isolation (SFI) relies on a large virtual address space that is statically partitioned in order to enforce safe sharing of the virtual address space by multiple cooperative modules. Such static partitioning cannot be used in the severely limited address spaces specific to sensor nodes. Several hardware assisted protection techniques have also been proposed for high-end desktop/server class systems. However, the hardware solutions involve complex and expensive hardware extensions, which are not viable for the simple hardware architecture of sensor nodes.

In the area of wireless sensor networks, most research has focused on developing network-level protocols either to diagnose/localize problems, or to overcome unreliability using such concepts as voting and trust. However, research into node-level support for protecting against memory faults is very limited, with reboot of the entire node the most common approach adopted on a sensor node.

BRIEF SUMMARY OF THE INVENTION

The present invention is directed to a method and system for handling memory faults. This method and system can be implemented in a sensor node of a sensor network. For example, the method can be implemented as a software only solution on a sensor node in a sensor network. The present invention can protect the operating system kernel state of a sensor node from any corruption by illegal memory writes by application modules executed on the sensor node. The present invention can also ensure that an application module never operates on a corrupted state. The present invention is not limited to sensor networks, and can be similarly used to handle memory corruption in various other types of computer systems.

In order to protect the operating system of a sensor node, coarse-grained memory protection is provided by creating and enforcing an application fault domain in the data memory address space of the sensor node. The data memory accessible by the application modules is restricted to a region within the data memory address space—this region is defined herein as the "application fault domain". The application modules are prevented from accessing memory outside the application fault domain through software-based run-time checks. The state belonging to the operating system is maintained outside of the application fault domain, and is thus protected from memory corruption from any application module.

In order to ensure that an application module does not operate on a corrupted state, fine-grained corruption detection and recovery is provided within the application fault domain. Any corruption of memory within the application fault domain due to another application module is detected by a run-time memory integrity verifier implemented within the operating system kernel. The fault detection is performed before, usually immediately before, the corrupted memory can be used by any application module. Recovery involves purging the corrupted state and restarting only the affected application module to operate on a fresh initial state.

According to one embodiment of the present invention, multiple application modules are executed in a single data memory space. Prior to each execution of each application module, the system detects whether the state of the application module is corrupted. If the state of an application module is corrupted, that application module is micro-rebooted.

The method and system of the present invention are usable with the operational characteristics of a sensor node, but are not limited thereto. The present invention may combine memory protection with error detection and recovery. Since the limited address space on a sensor node prohibits the implementation of a separate fault domain for every application module, coarse-grained memory protection may be used to protect the operating system state of a sensor node. The present invention also implements a fault domain whose size can be automatically adjusted at run-time based on current resource requirements. Furthermore, since run-time checks usually only impact the application modules, the performance of the operating system is not affected. Time sensitive operations such as interrupt handling are usually performed by the operating system kernel, and are not affected by the run-time integrity checks for corruption detection.

These and other advantages of the invention will be apparent to those of ordinary skill in the art by reference to the following detailed description and the accompanying drawings.

DETAILED DESCRIPTION OF EXEMPLARY EMBODIMENTS

The present invention is directed to handling memory faults. The present invention is usable with sensor networks to handle memory corruption in sensor nodes of sensor networks. Although the present invention is described herein as being implemented on a sensor node of a sensor network, the present invention is not limited to sensor networks, and can be similarly used to handle memory corruption in various other types of computer systems.

Figure 1:
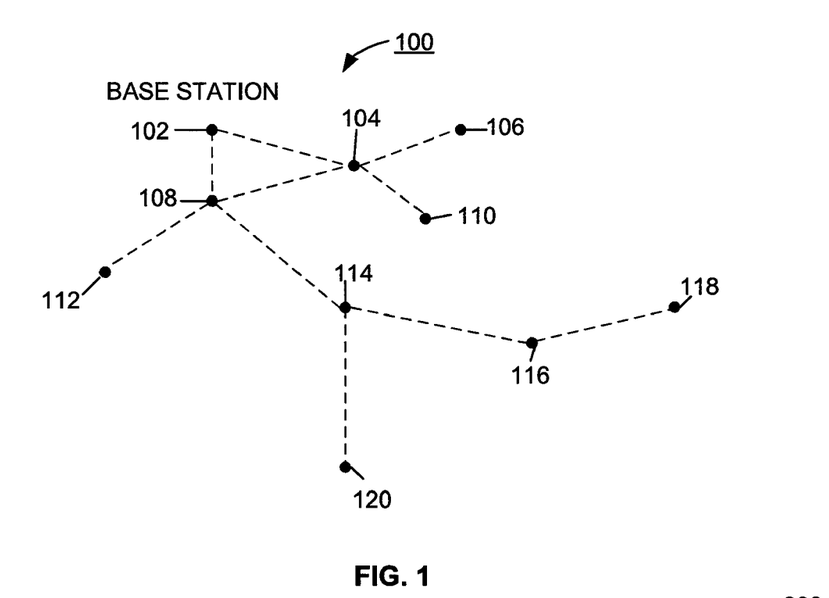
FIG. 1 illustrates the network topology of an exemplary sensor network.

FIG. 1 illustrates the network topology of an exemplary sensor network 100. As illustrated in FIG. 1, the sensor network includes a base station 102 and multiple sensor nodes 104, 106, 108, 110, 112, 114, 116, 118, and 120. Each of the sensor nodes 104, 106, 108, 110, 112, 114, 116, 118, and 120 is a wireless sensor device which senses some type of data. Each of the sensor nodes 104, 106, 108, 110, 112, 114, 116, 118, and 120 communicates with at least one of the other sensor nodes 104, 106, 108, 110, 112, 114, 116, 118, and 120 within a limited radio signal range. In sensor network 100, at least the sensor nodes 104 and 108 communicate with the base station 102. The data sensed at each of the sensor nodes 104, 106, 108, 110, 112, 114, 116, 118, and 120 is converted into data packets and the data packets are routed to the base station via the sensor nodes 104, 106, 108, 110, 112, 114, 116, 118, and 120. The network topology shown in FIG. 1 is a simplified representation of a sensor network. As is well known, communications in sensor networks can be affected by a variety of other issues in addition to range, such as interference, hidden nodes, etc.

Figure 2:
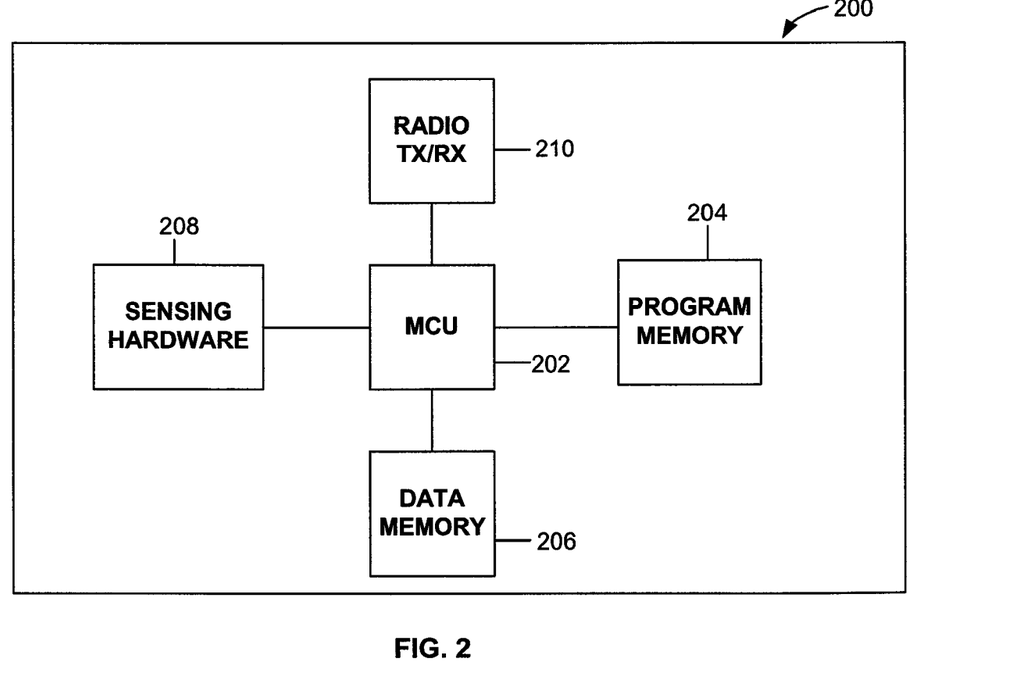
FIG. 2 illustrates a high level block diagram of sensor node hardware capable of implementing the present invention.

FIG. 2 illustrates a high level block diagram of sensor node hardware capable of implementing the present invention. As illustrated in FIG. 2, a sensor node 200 contains a microcontroller (MCU) 202 which executes the overall operations of the sensor node 200 defined by the kernel and application modules. The SOS kernel and the application modules are stored as binary images in a program memory 204. The program memory 204 can be implemented as flash memory. The application modules include core modules (kernel) defining an operating system of the sensor node 200, as well as modules for executing various tasks, such as sensing, localization, time-synchronization, routing, updating, etc. A data memory 206 stores states belonging to the various application modules. The state of a particular application module refers to any data that is associated with that application module. For example, the state belonging to a routing module can include data identifying a next hop in a data path, and the state belonging to a sensing application module can be sensed data when executing the sensing module. The data memory 206 is a dynamic memory, such as RAM. Sensing hardware 208 is controlled by the MCU 202 to sense a condition and collect data. Various types of sensing hardware 208 can be used to sense a variety of conditions, such as temperature, pressure, magnetic field, etc, depending on the purpose of the sensor node 200. A radio transceiver 210 transmits and receives radio signals for communicating with other sensor nodes and/or a base station. Data collected by the sensing hardware 208 is transmitted by the radio transceiver 210 to a base station via one or more hops through the sensor network. The radio transceiver 210 is typically implemented as a low energy transceiver having a limited range.

Various operating systems exist for sensor networks. The operating system mainly controls scheduling, resource management, and facilities for both intra and inter-node communication. TinyOS, a prevalent operating system, uses reusable software components to implement common services, but all of the nodes in the sensor network run a single statically linked system image. For the purposes of memory protection, fault isolation, and efficient recovery, however, a single binary image is not amenable. In contrast, a modular software architecture with a clear separation of kernel and user components provides for natural boundaries to enforce such features. Such a modular software architecture is used in more recently developed operating systems including SOS, MANTIS, and Contiki. These operating systems maintain modularity at the binary level without loss in efficiency as compared to TinyOS. The present invention is described herein as being implemented using SOS. However, the present invention is not limited to SOS and any modular operating system is suitable for implementing the present invention.

SOS is a sensor operating system in which a kernel is installed on all of the nodes in the sensor network. The rest of the system and the application level functionality are implemented by a set of dynamically loadable binary modules, which are referred to herein as modules. This modularity forms the basis of the SOS software architecture, as it defines distinct boundaries and allows each module to be loaded and unloaded at runtime. Furthermore, this separation allows the SOS kernel to track ownership of each memory block at runtime and identify the execution context.

Figure 3A:
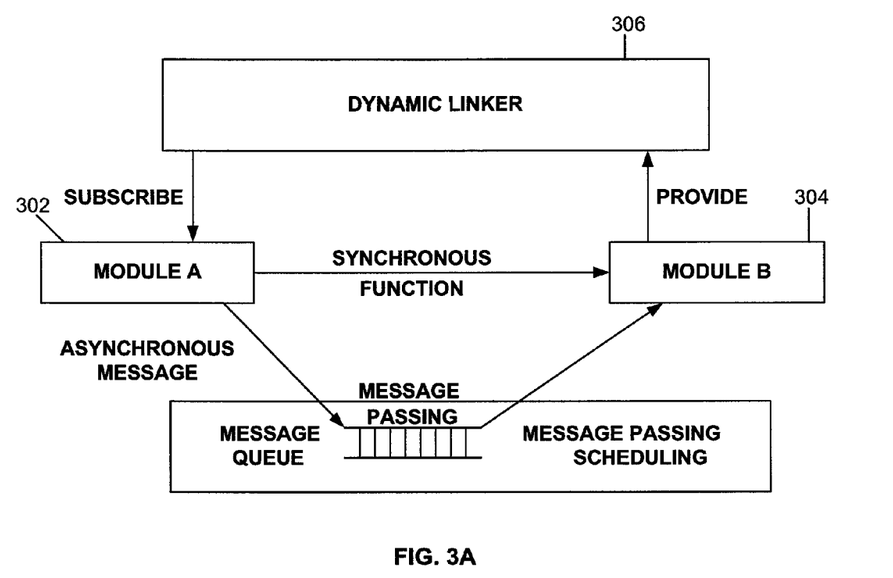
FIG. 3A illustrates inter-module communication in SOS (Sensor Operating System)
Figure 3B:
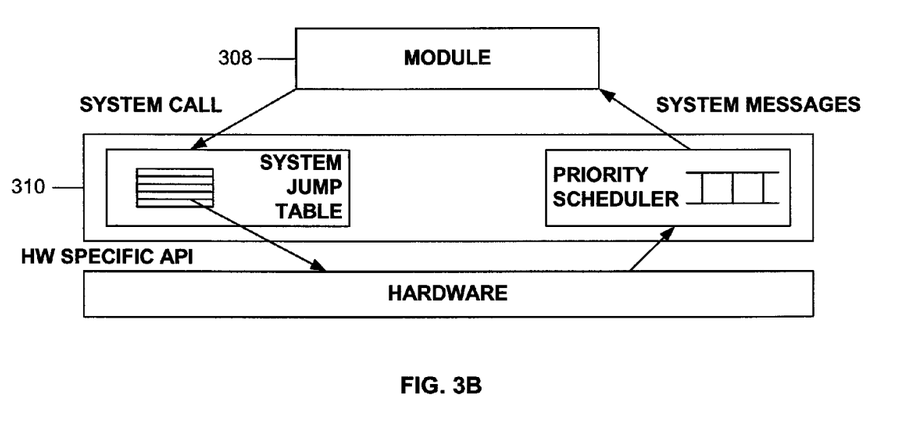
FIG. 3B illustrates module-kernel communication in SOS.

FIGS. 3A and 3B illustrate the basic communication architecture within SOS. As shown, modules 302, 304, 308 use well-defined communication paths to interact with each other and with the SOS kernel 310. Each module 302, 304, 308 implements a required message handler, and optionally, implements one or more functions that it provides to the rest of the system. Other modules 302, 304, 308 can choose to subscribe to the latter functions. As illustrated in FIG. 3A, modules 302 and 304 can communicate with each other through asynchronous message passing or synchronous function calls, achieved through sending messages delivered to the corresponding message handler or by calling provided functions, respectively. A dynamic linker 306 helps link subscribed functions to the provided ones at the time of module loading.

FIG. 3B similarly illustrates module-kernel communication. Modules 308 invoke well-known system calls and receive system messages delivered asynchronously to the module's message handler. These well-defined module-module and module-kernel communication paths present clean interposition points for the SOS kernel 310 to accurately track both execution context and memory ownership information as execution and data cross boundaries.

Figure 4:
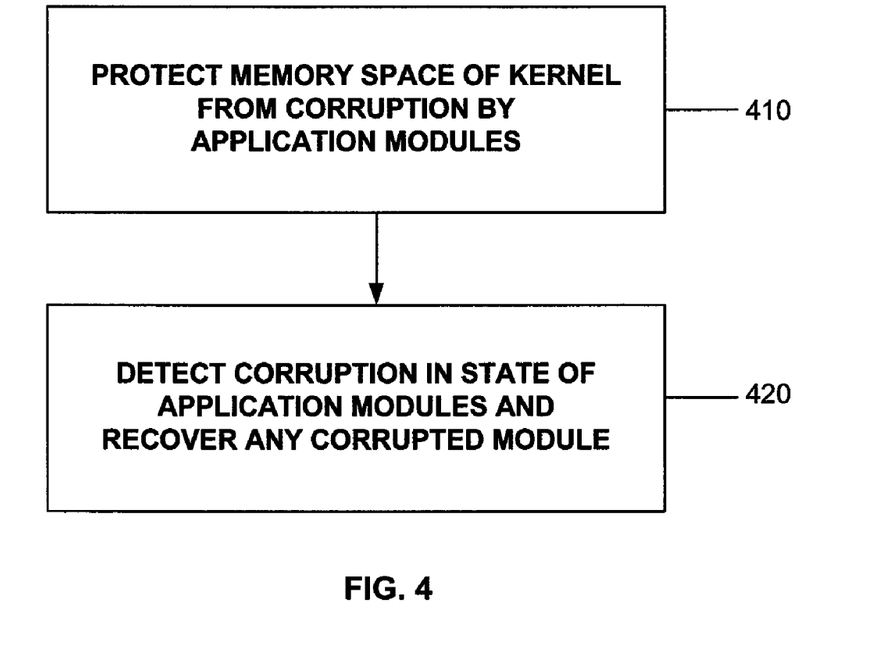
FIG. 4 illustrates a method of protecting a sensor node from memory corruption faults according to an embodiment of the present invention.

FIG. 4 illustrates a method of handling memory faults in a sensor node according to an embodiment of the present invention. This method can be implemented in a two-tier software based scheme. The first tier (step 410) uses coarse-grained memory protection to protect the core services of the sensor node operating system (resource management, communication, scheduling, etc.) from corruption by memory faults caused by application modules. The second tier (step 420) provides fine-grained detection of corrupted application modules and recovery of the corrupted application modules.

Figure 5:
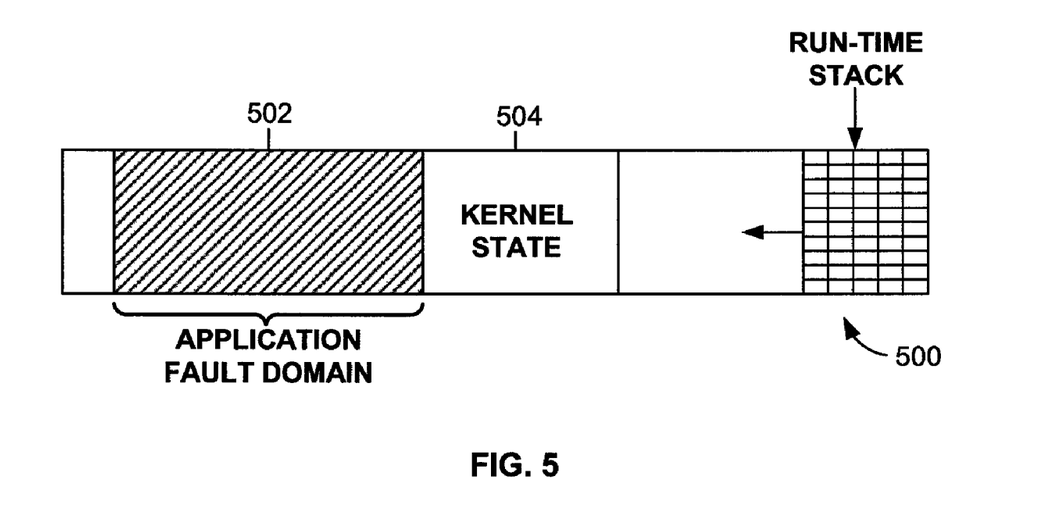
FIG. 5 illustrates an exemplary data memory address space of a sensor node.

Because handling corruption relies on data structures and state maintained in the kernel, it is important to protect the kernel itself from corruption by application modules. As illustrated in FIG. 4, at step 410, the memory space of the kernel is protected from corruption by application modules. The memory space pf the kernel is protected using coarse-grained memory protection, in which an application fault domain is defined within the data memory address space of the sensor node. The application fault domain refers to a portion of the overall data memory address space which is allocated for the use of the application modules. FIG. 5 illustrates an exemplary data memory address space 500 of a sensor node. As illustrated in FIG. 5, the application fault domain 502 is separated from the kernel state 504. The state (data) belonging to the application modules resides entirely within the application fault domain 502. The kernel state 504 resides entirely outside of the application fault domain 502.

The application fault domain 502 is enforced using dynamic memory allocation so that the size of the application fault domain 502 can be changed depending on available resources. When an application module needs memory, the SOS kernel allocates a block of memory within the application fault domain 502 for the use of the application module. According to a possible embodiment of the invention, the memory can be allocated using a dynamic memory allocation technique which ensures that the address range belonging to all application modules (application fault domain) and the address range of kernel memory blocks are contiguous and non-overlapping. This implementation is illustrated in FIG. 5, where the application fault domain 502 is one contiguous range of memory, and the kernel state 504 is another contiguous range of memory and these ranges do not overlap. This allows the application fault domain 502 to be defined by a range of memory addresses, and an easily recognizable boundary exists between the application fault domain 502 and the kernel state 504. In order to prevent artificial resource constraints due to fragmentation of unused blocks of memory in the middle of application fault domain 502 which cannot be allocated to the kernel, it is possible to optimize the allocation algorithm to favor allocation of blocks in a contiguous order so that fragmentation of the application fault domain 502 is limited.

Although allocating memory such that the application fault domain and the kernel state are contiguous ranges of memory is described above, the present invention is not limited to this embodiment. It is also possible that the application fault domain include non-contiguous blocks of data allocated for use of the application modules and the kernel. In this case, it is necessary to keep track of which blocks of data are allocated to the kernel and which blocks of memory are allocated to the application fault domain, instead of identifying the application fault domain and the kernel state by contiguous ranges of memory blocks.

It is necessary to enforce the application fault domain during data sharing as well as in allocating memory. The application modules and the SOS kernel interact and share data with one another through asynchronous messages as described above (see FIG. 3B). These messages passed to application modules from the kernel never contain pointers to the operating system data structures. For example, in SOS, synchronous function calls from the kernel to the modules are restricted to dynamically loadable sensor driver modules. In this case, the kernel describes an interface that the sensor driver modules have to implement, and the interface definition does not contain any pointer parameters. Accordingly, no application module can legally contain a reference to any operating system (kernel) state. Conversely, the SOS kernel may hold references to memory blocks owned by an application. However, the kernel never operates (i.e., reads or writes) on those blocks, but merely passes them on to other modules or drivers.

The kernel communicates information to the application modules by passing the actual data in the payload of a message. The modules are permitted to read the message payload, but writing to the memory location of the message payload or retaining a reference to the message payload requires the modules to take ownership of the payload. For example, in SOS, the ownership transfer of the message payload occurs through a ker_msg_take_data system call. In order to enforce the application fault domain, the system call to take ownership of the message payload first checks if the message payload is allocated from within the fault domain. If the payload resides outside of the application fault domain, it is copied into a new buffer allocated from within the application fault domain. Thus, if the memory location of the message payload is allocated to the kernel, the memory location is not reallocated to an application module. Instead, a new memory block inside the application fault domain is allocated to the application module, and the message payload is copied into this memory block.

Figure 6:
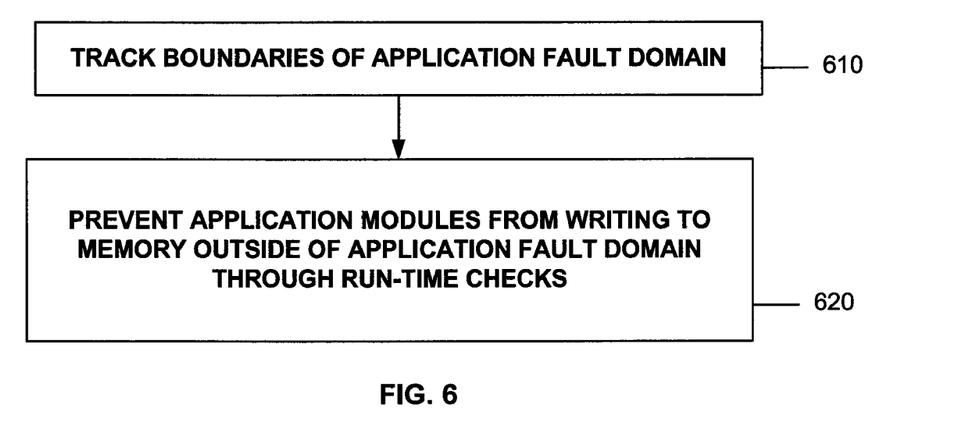
FIG. 6 illustrates a method of enforcing the application fault domain through run-time checks according to an embodiment of the present invention.

FIG. 6 illustrates a method of enforcing the application fault domain through run-time checks according to an embodiment of the present invention. As illustrated in FIG. 6, at step 610, the boundaries of the application fault domain are tracked. Since the memory is dynamically allocated, the size and boundaries of the application fault domain can change as memory is allocated to application modules or the SOS kernel. Accordingly, the boundaries of the application fault domain can be tracked in the kernel as they change.

At step 620, the application modules are prevented from writing to memory outside the application fault domain through run-time checks. This can be performed by the bounds checker implemented in the SOS kernel. The application modules make calls to the bounds checker before any operation that attempts to write to the data memory. These calls can be inserted in the application modules by rewriting the binary or the source code of the application modules. Thus, the calls can be implemented with or without the involvement of the designer of an application module. The bounds checker then determines whether the memory location to which an application module is attempting to write is within the application fault domain. When the application fault domain is allocated as a contiguous range of memory blocks, the bounds checker can compare the memory location with the boundaries of the application fault domain to determine whether the memory location is within the application fault domain. If the memory location is within the application fault domain, the application module is permitted to write to that memory location. If the memory location is not within the application fault domain, the application module is prevented from writing to the memory location. In this case, a customized error handler for the application module is invoked. For example, the error handler can stop and/or restart the faulting application module. The action of an error handler of an application module is customizable so error handlers of different application modules may take different actions in response to the application module attempting to write to a memory location outside of the application fault domain.

The limited address space in the data memory makes it infeasible to create contiguous fault domains for each application module, so multiple application modules execute within a single memory space (the application fault domain). Accordingly, the state of an application module can be corrupted by other application modules in the application fault domain. Returning to FIG. 4, at step 420, memory corruption is detected in the state of the application modules within the application fault domain and any corrupted application module is recovered. This step uses a memory integrity verification method implemented in the SOS kernel to detect memory corruption after it has occurred, but before the corrupted memory can be used by the affected module. Upon detection of memory corruption, the affected module is restored to an uncorrupted state.

In order to perform the memory integrity verification, the kernel must be capable of maintaining a block-level memory ownership model. The SOS kernel accurately tracks the module ownership of all of the memory blocks in the application fault domain. The kernel also is also capable of tracking the execution of the application modules on the sensor node, which is referred to as the control flow of the system. The SOS kernel can monitor all of the control flow entry/exit points into/from a module.

Since SOS is a non-preemptive cooperatively scheduled system, an application module cannot interrupt the execution of another module. Therefore, the contents of the memory block owned by an application module should not change between successive invocations of the module. Accordingly, the memory integrity verification method detects whether the contents of a memory block owned by a module have changed between successive invocations of the module. For each memory block in the application fault domain, a memory integrity code (MIC) is calculated as a function of the contents of the memory block and stored. An MIC is a value that is calculated as a function of the contents of memory to summarize the contents of the memory. For example, the MIC can be a checksum. The checksum can be implemented using a well-known CRC-16 algorithm. The MIC for each memory block of the application fault domain is stored in a table within the memory address space allocated for the kernel. This protects the MIC from being corrupted since the kernel address space is protected against corruption by the application modules, as described above.

Figure 7:
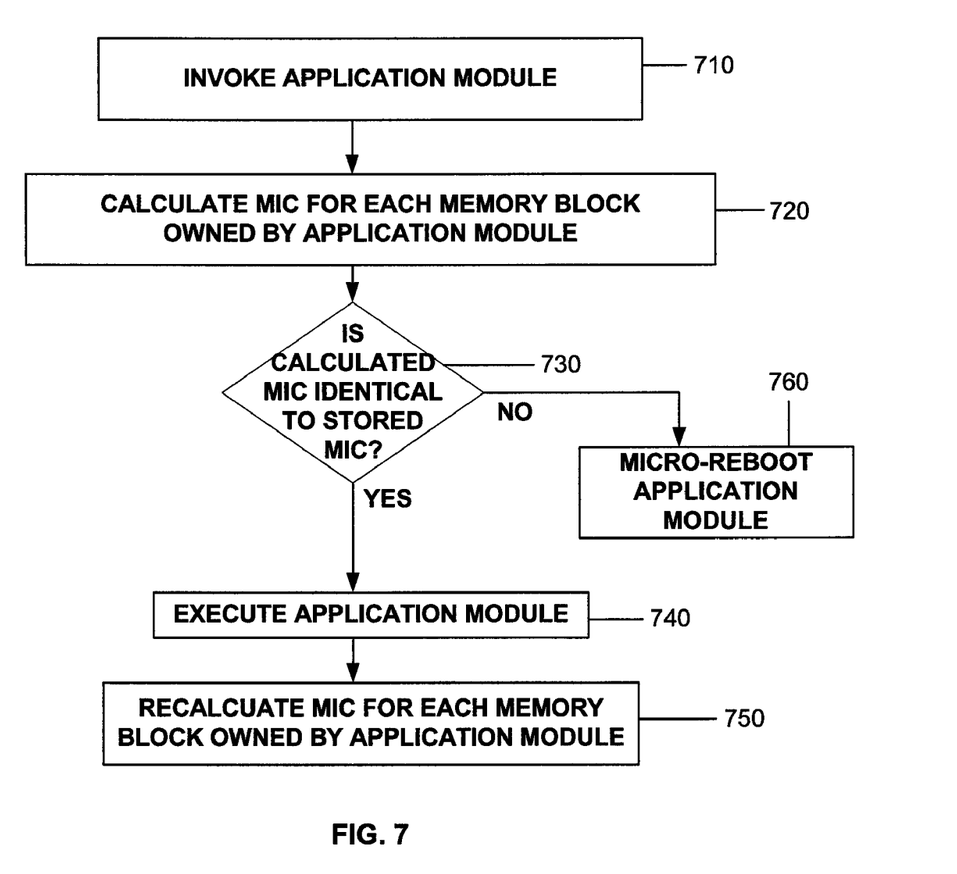
FIG. 7 illustrates a method of memory integrity verification and corrupted application module recovery according to an embodiment of the present invention.

Whenever an application module is invoked (i.e., at a control flow entry point into an application module), memory integrity verification is performed for the application module. FIG. 7 illustrates a method of memory integrity verification and corrupted application module recovery according to an embodiment of the present invention. At step 710, an application module is invoked. As described above (see FIG. 3), the control flow can only enter a module from well-defined points within the system. These points are the message handler that handles messages from other modules and the kernel, and the synchronous function calls invoked from other modules.

At step 720, an MIC is calculated for each memory block owned by the application module based on the contents of the memory block. As described above, the MIC can be a checksum. At step 730, the calculated MIC for each memory block owned by the application module is compared to the stored MIC for each memory block to determine whether the calculated and stored MICs are identical for each memory block. If the calculated and stored MICs are identical for each memory block owned by the application module, the method proceeds to step 740. If the calculated and stored MICs are not identical for any of the memory blocks owned by the application module, the memory of the application module has been corrupted, and the method proceeds to step 760. Although in the embodiment of FIG. 7, the integrity of the memory of an application module is checked prior to executing the application module, according to another embodiment of the present invention, it is possible that the memory integrity verification be performed during the execution of an application module immediately before the application module first attempts to access the memory.

At step 740, the application module is executed. Since it is determined at step 730 that the calculated and stored MICs matched for each memory block owned by the application module, the memory of the application module has not been corrupted and the module can be executed. In the embodiment in which the memory integrity verification is performed during the execution of an application module, the application module is permitted to access the memory and continue executing when it is determined that the calculated and stored MICs match for the memory block that the application module is attempting to access.

At step 750, the MIC is recomputed for each memory block owned by the application module after the execution of the application module, and the stored MIC for each of the memory blocks are replaced with the recomputed MIC. This takes into account any legitimate changes in the contents of the memory block during the execution of the application module. It is possible that the MIC only be recomputed and replaced for those memory blocks whose contents have been modified during the execution of the application module.

At step 760, the application module associated with the corrupted memory is micro-rebooted. As used herein, the term micro-reboot refers to restarting only a particular application module and restoring its state to a previous uncorrupted state. This uncorrupted state may be an initial state of the application module or a more recent state of the application module which is known to be uncorrupted. This purges the corrupted state of the application module. It is important to note that the micro-reboot only restarts the corrupted application module. Thus, the recovery time is much lower compared to a full reboot of the sensor node. Also, the micro-reboot causes minimal disruption to the other application modules running on the node that are not directly interacting with the corrupted application module.

The SOS kernel is capable of loading and unloading application modules at run-time. When a module is loaded into the system, the kernel allocates resources required by the module and links the functions that the module subscribes to and publishes. During the module unload, the kernel releases the module's resources and de-links the module's functions. For example, the micro-reboot can be implemented in SOS by unloading the application module, and then reloading it into the system. This restarts the application module with its initial state. It is also possible to eliminate unnecessary steps such as de-linking the functions provided by the module, since the module is immediately loaded back into the system.

According to an embodiment of the present invention, it is also possible that when the state of an application module is corrupted, the kernel can identify one or more suspect application modules, which are suspected of corrupting the application module. The identification of suspect application modules can be implemented by the kernel keeping a log of the executions of the application modules. When the state of an application module is determined to be corrupted, the kernel can then check the log to determine which other application modules have been executed since the previous execution of the corrupted application module in order to determine the suspect application modules. It is possible that the kernel keep an ongoing list of suspect application modules, in order to narrow the list down to a culprit application module which is responsible for corrupting the state of other application modules. This embodiment of the present invention allows the kernel to diagnose possible causes for memory corruption in addition to detecting memory corruption and recovering an application module having a corrupted state.

As described above, the present invention provides a node-level software-based memory fault detection and recovery method usable in sensor nodes of sensor networks. This method detects memory faults locally and provides efficient local recovery. This local recovery could aid or speed up network-level recovery mechanisms. Although the present invention is described above as being implemented in a sensor node, the present invention can be implemented on various other types of computer systems.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
executing multiple application modules which access memory in a single memory address space;
prior to a memory access to an application state by an application module, detecting whether the state of the application module is corrupted;
when the state of the application module is corrupted, micro-rebooting the application module; and
when the state of the application module is not corrupted, permitting the application module to access the at least one block of memory allocated to the application module up to completion of a current execution of the application module, recalculating the MIC for the at least one block of memory allocated to the application module immediately after the execution of the application module, and replacing the stored MIC for the at least one block of memory allocated to the application module with the recalculated MIC for the at least one block of memory allocated to the application module;
wherein each of the application modules is allocated at least one block of memory in said single data memory space, and said step of detecting whether a state of the application module is corrupted comprises:
calculating a memory integrity code (MIC) for the at least one block of memory allocated to the application module as a function of content stored in the at least one block of memory allocated to the application module;
comparing the calculated MIC with a stored MIC for the at least one block of memory allocated to the application module;
when the calculated MIC is identical to the stored MIC for the at least one block of memory allocated to the application module, determining that the state of the application module is not corrupted; and
when the calculated MIC is not identical to the stored MIC for the at least one block of memory allocated to the application module, determining that the state of the application module is corrupted.

2. The method of claim 1, further comprising:
when the state of the application module is not corrupted, permitting the memory access by the application module.

3. The method of claim 1, wherein said step of detecting whether a state of the application module is corrupted is performed prior to execution of the application module.

4. The method of claim 1, wherein said step of calculating a memory integrity code (MIC) comprises: calculating said MIC using a checksum function.

5. The method of claim 1, wherein said step of micro-rebooting the application module having the corrupted state comprises:
restarting the application module and restoring the state of the application module to an uncorrupted state.

6. The method of claim 1, wherein said step of micro-rebooting the application module having the corrupted state comprises:
unloading the application module; and
reloading the application module.

7. The method of claim 1, further comprising:
preventing the application modules from writing to memory locations outside of an application fault domain defined within said single data memory space;
maintaining a state of an operating system kernel in a portion of said single data memory space outside of said application fault domain.

8. The method of claim 7, further comprising:
dynamically allocating memory locations associated with program modules to a first range of contiguous memory addresses and memory locations associated with an operating system kernel to a second range of contiguous memory addresses, wherein said first and second ranges of contiguous memory addresses do not overlap; and defining said first range of contiguous memory addresses as said application fault domain.

9. The method of claim 8, wherein said step of preventing the application modules from writing to memory locations outside of an application fault domain comprises:
tracking boundaries of said first range of memory addresses;
comparing a target memory address of an application module with said boundaries of said first range of memory addresses;
when the target memory address is within said boundaries of said first range of memory addresses, permitting the application module to write to the target memory address; and
when the target memory address is not within said boundaries of said first range of memory addresses, preventing the application module from writing to the target memory address.

10. The method of claim 1, further comprising:
when the state of the application module is corrupted, identifying one or more suspect application modules suspected of corrupting the state of the application module.

11. A computer readable medium storing computer program instructions for handling memory faults, said computer program instructions defining the steps comprising:
executing multiple application modules which access memory in a single memory address space;
prior to a memory access to an application state by an application module, detecting whether the state of the application module is corrupted;
when the state of the application module is corrupted, micro-rebooting the application module; and
when the state of the application module is not corrupted, permitting the application module to access the at least one block of memory allocated to the application module up to completion of a current execution of the application module, recalculating the MIC for the at least one block of memory allocated to the application module immediately after the execution of the application module, and replacing the stored MIC for the at least one block of memory allocated to the application module with the recalculated MIC for the at least one block of memory allocated to the application module;
wherein each of the application modules is allocated at least one block of memory in said single data memory space, and the computer program instructions defining the step of detecting whether a state of the application module is corrupted comprise computer program instructions defining the steps:
calculating a memory integrity code (MIC) for the at least one block of memory allocated to the application module as a function of content stored in the at least one block of memory allocated to the application module;
comparing the calculated MIC with a stored MIC for the at least one block of memory allocated to the application module;
when the calculated MIC is identical to the stored MIC for the at least one block of memory allocated to the application module, determining that the state of the application module is not corrupted; and
when the calculated MIC is not identical to the stored MIC for the at least one block of memory allocated to the application module, determining that the state of the application module is corrupted.

12. The computer readable medium of claim 11, wherein the computer program instructions defining the step of detecting whether a state of the application module is corrupted comprise computer program instructions defining the step of:
detecting whether a state of the application module is corrupted prior to execution of the application module.

13. The computer readable medium of claim 11, wherein the computer program instructions defining the step of calculating a memory integrity code (MIC) comprise computer program instructions defining the step of:
calculating said MIC using a checksum function.

14. The computer readable medium of claim 11, wherein the computer program instructions defining the step of micro-rebooting the application module having the corrupted state comprise computer program instructions defining the step of:
restarting the application module and restoring the state of the application module to an uncorrupted state.

15. The computer readable medium of claim 11, wherein the computer program instructions defining the step of micro-rebooting the application module having the corrupted state comprise computer program instructions defining the steps of:
unloading the application module; and
reloading the application module.

16. The computer readable medium of claim 11, further comprising computer program instructions defining the steps of:
preventing the application modules from writing to memory locations outside of an application fault domain defined within said single data memory space;
maintaining a state of an operation system kernel in a portion of said single data memory space outside of said application fault domain.

17. The computer readable medium of claim 16, further comprising computer program instructions defining the steps of:
dynamically allocating memory locations associated with program modules to a first range of contiguous memory addresses and memory locations associated with an operating system kernel to a second range of contiguous memory addresses, wherein said first and second ranges of contiguous memory addresses do not overlap; and
defining said first range of contiguous memory addresses as said application fault domain.

18. The computer readable medium of claim 17, wherein the computer program instructions defining the step of preventing the application modules from writing to memory locations outside of an application fault domain comprise computer program instructions defining the steps of:
tracking boundaries of said first range of memory addresses;
comparing a target memory address of an application module with said boundaries of said first range of memory addresses;
when the target memory address is within said boundaries of said first range of memory addresses, permitting the application module to write to the target memory address; and
when the target memory address is not within said boundaries of said first range of memory addresses, preventing the application module from writing to the target memory address.

19. The computer readable medium of claim 11, wherein the computer program instructions are implemented in an operating system kernel installed on a sensor node.

20. The computer readable medium of claim 19, wherein said operating system comprises Sensor Operating System (SOS).

21. The computer readable medium of claim 11, further comprising computer program instructions defining the step of:

when the state of the application module is corrupted, identifying one or more suspect application modules suspected of corrupting the state of the application module.

* * * * *